Nov. 8, 1949

W. H. HOLMAN, III 2,487,337

SCANNING SEXTANT

Filed Dec. 28, 1946

Inventor
William H. Holman III

By Stevens, Davis and Miller
Attorneys

Nov. 8, 1949 W. H. HOLMAN, III 2,487,337
SCANNING SEXTANT
Filed Dec. 28, 1946 2 Sheets-Sheet 2

Inventor
William H. Holman III
By Stevens, Davis and Miller
Attorneys

Patented Nov. 8, 1949

2,487,337

UNITED STATES PATENT OFFICE 2,487,337

SCANNING SEXTANT

William H. Holman, III, Flushing, N. Y.

Application December 28, 1946, Serial No. 719,098

7 Claims. (Cl. 88—1)

This invention relates to navigation instruments and more particularly to sextants of the type used in marine and aerial navigation.

According to navigation theory an observer determines his position by noting the smallest angles defined between a plane tangent to the earth at the observation point and a line from such observation point to each of two or more celestial bodies or to the same celestial body at two or more different times. In practice, however, it is apparent that the observer cannot locate a plane tangent to the earth at the observation point since at the earth's surface there would be no horizon which could be viewed to afford a basis for locating the plane. Hence, in practical navigation, the angles to the celestial body are determined by reference to a plane at the observer's eye level which is parallel to, but above, a plane tangent to the earth at the observation point. Such a plane is calculated by deducting the dip angle, or the angle defined between a line from the point of observation to the horizon and a plane parallel to a plane tangent to the earth's surface at the observation point, from the observed angle defined between the line of sight to the horizon and the line of sight to the celestial body. Of course, such calculations are tabulated so that in practice the observer merely notes the angle between a line to the horizon and to the celestial body and refers to the appropriate table which sets forth the dip at the observer's height above the earth's surface at sighting time.

The foregoing theory and practice has been followed for many years in marine navigation, and in large vessels in calm weather the results are good, susceptible, of course, to personal error of the observer. It is apparent, however, that in rough weather wave motion may make it virtually impossible for the observer to determine accurately his height above the earth's surface. This introduces additional error which is particularly troublesome in small vessels where the relative change in height of a fixed point on the ship is great.

It is therefore an object of this invention to provide for the measurement of lines of position without regard to dip, and hence, without regard to the height of the observer at the time the observation is made, so that error heretofore introduced due to error in the observer's height measurement is wholly eliminated.

According to the present invention it is proposed to provide the observer simultaneously with two adjacent horizons taken 180° apart, one being erect and the other being inverted, said horizons together defining a bisector plane which lies parallel to a plane tangent to the earth at the observation point and which is used as the reference line for sighting the celestial body.

As an incident to the provision of two horizons, one inverted and one erect, this invention eliminates the necessity for semi-diameter corrections, corrections for refraction error in the sight line to the horizon and personal error of the observer.

It is a further object of this invention to provide a navigation instrument wherein a true plane parallel to a plane tangent to the earth's surface at the observation point is afforded regardless of the rate of change of the observer's height during the sighting operation.

Other objects and advantages of the invention will be apparent upon consideration of the following detailed description of a preferred embodiment thereof in conjection with the annexed drawings wherein:

Figure 4 is a view in section taken along the line 4—4 of Figure 1;

Figure 5 is a perspective view showing a preferred mounting for some of the mirrors shown in Figures 2, 3 and 4; and Figure 6 is a view in elevation of a virtual image as viewed by an operator of the instrument while taking a sight for navigation purposes.

Figure 1:
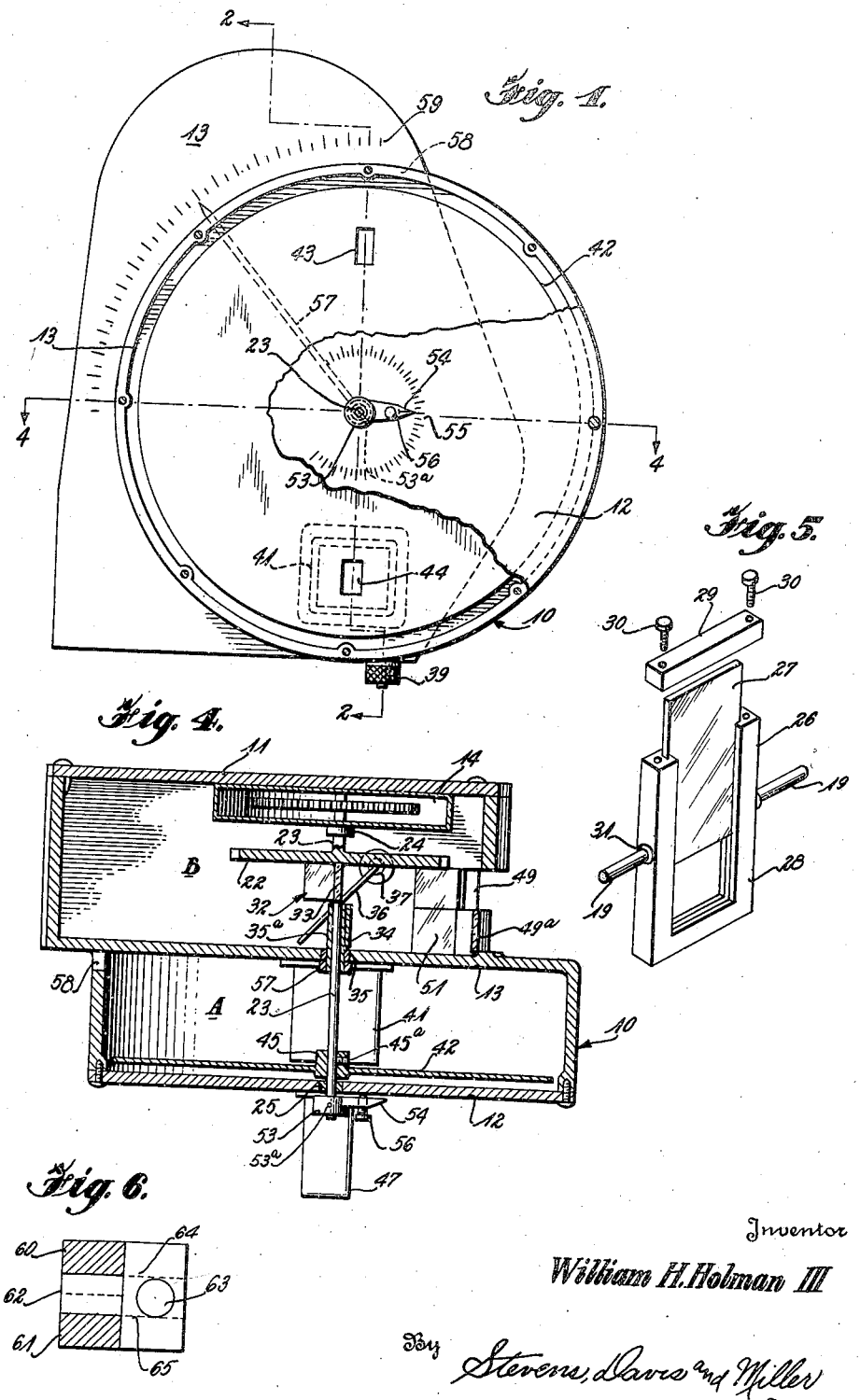
Figure 1 is a view in side elevation of a sextant constructed in accordance with the teachings of the present invention.

Referring now with greater particularity to the drawings, the instrument is mounted within a casing 10 having a back wall 11 and a front wall 12 as well as a central partition 13 dividing the interior of the casing into compartments A and B.

Within the compartment B and attached to the rear wall 11, there is mounted a motor 14 which may be a small electric motor of any suitable type or a clock motor of the sort used in operating 16 millimeter motion picture cameras. Since this motor forms no part of the present invention it is not described in detail. Whatever motor is used, however, must be provided with a drive shaft 15 projecting in a direction away from the wall 11 of the housing. Attached to the shaft 15 to be driven thereby is a pinion 16 which is arranged to mesh with a gear 17 which is attached to a gear 18, both of gears 17 and 18 being keyed or otherwise fixed to a shaft 19 mounted for rotation in bearings 20 and 21, the bearing 20 being suitably attached on the casing of the motor 14. The gear 18 meshes with a like gear 22 keyed to a shaft 23 for rotation therewith, the shaft 23 being mounted in bearings 24 and 25 and passing through the partition 13. Supported from the shaft 19 and constituting an integral part thereof is a mirror assembly 26 consisting of a mirror element 27 having reflecting surfaces on both sides and mounted in a channel frame 28 having a removable cover element 29 which is secured in position by screws 30. On the side of the frame 28 there are provided bosses 31 or other means for attaching the elements of the shaft 19 to the frame 28 so that the latter becomes structurally part of the former, see Figure 5.

Below the mirror 26 there is located another mirror assembly 32 including a transparent mirror element 33. The mounting of the element 33 in the assembly 32 is not specifically described but it is to be understood that this mirror will also be mounted, as shown in Figure 5, in connection with the mirror 27. Between the mirrors 27 and 33 on the one hand, and the partition 13 on the other, there is located a mirror 34 mounted in cantilever fashion on a sleeve 35a surrounding shaft 23 and journaled at 35 in the partition 13.

Figure 2:
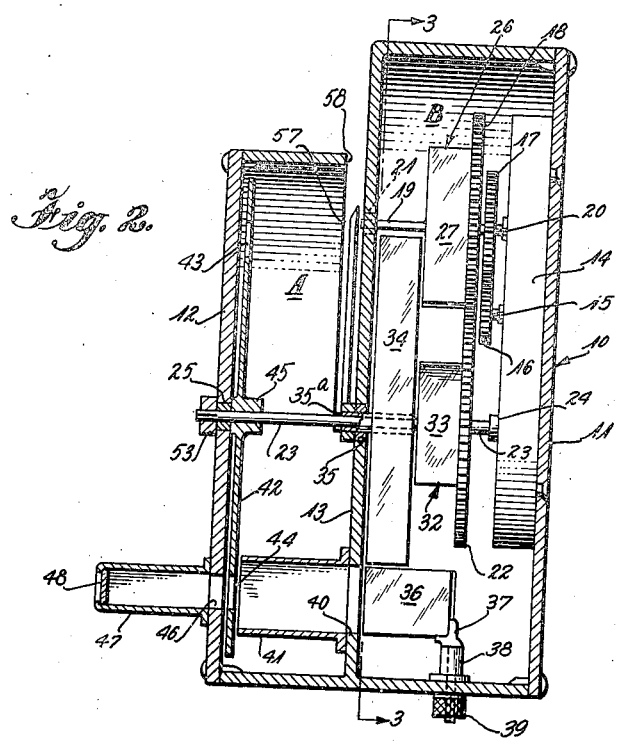
Figure 2 is a view in section of the instrument of Figure 1 taken along the line 2—2 of that figure.

Below and in registry with mirrors 27, 33 and 34 there is located a mirror 36 mounted in cantilever fashion on the end of a shaft 37 which is mounted in a bearing 38 in a portion of the casing proper. The angular disposition of the mirror 36 may be varied by movement thereof about the axis of the shaft 37, this movement being effected by a knurled operated knob 39 located outside of the housing 10. The partition 13 is provided with a sight opening at 40 which is at one end of a light duct 41 which is mounted on and supported from the partition 13 and extends to the left thereof, as viewed in Figure 2. Immediately above the unattached end of the light duct 41 there is a shutter 42 in the form of a circular disc having two apertures 43 and 44 therein radially disposed 180° apart. The shutter 42 is provided with a central hub 45 which is mounted on and keyed for rotation with the shaft 23 which supports in addition to the shutter 42, the mirror assembly 32 and the gear 22. The top cover 12 of the casing or housing 10 for the instrument is also provided with a sight aperture at 46 which is in registry with the aperture 40. Projecting outwardly from the cover 12 of the casing there is a light duct 47 provided with a transparent eyepiece 48.

Figure 3:
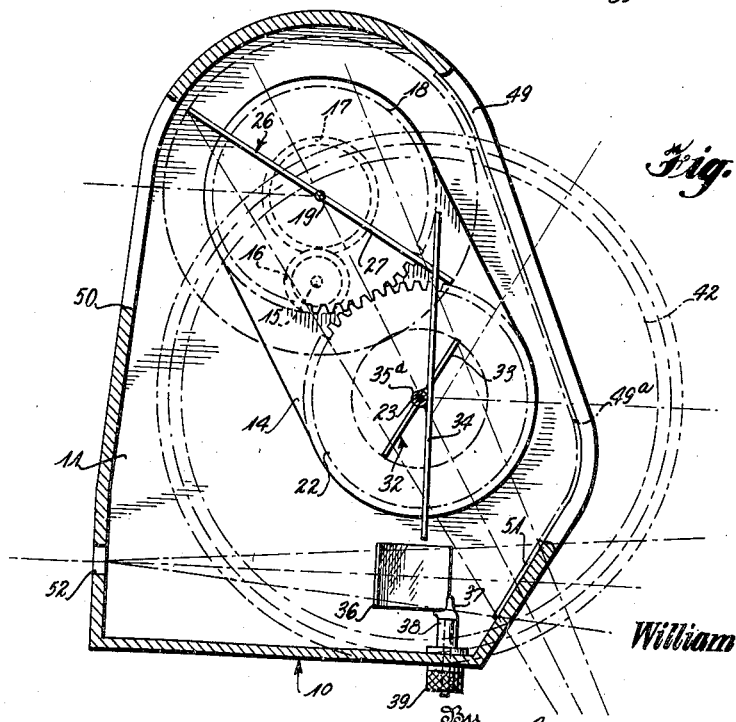
Figure 3 is a view in section taken along the line 3—3 of Figure 2.

Referring now to Figure 3 it can be seen that the housing 10 is provided with a light window at 49 of a width equal to the width of mirrors 33 and 34 and with a light window at 50 equal in width to the width of mirror 27. Thus, light from two sources 180° apart can be focused in the plane of the eyepiece 48. Light from window 50 strikes first the mirror 27 and is reflected thereby through the transparent mirror 33 onto a stationary mirror 51. Similarly, light from the window 49 strikes the transparent mirror 33 and is reflected thereby to the stationary mirror 51. The mirror 36 is then adjusted to a 45° position, as is shown in Figure 4, and this reflects the light from the mirror 51 out through the light ducts 41 and 47 to the eyepiece at 48.

Due to the fact that the mirrors 27 and 33 are keyed together by the gears 18 and 22, and since these mirrors, in the calibrating of the instrument, are given a predetermined angular relationship relative to each other and relative to the mirrors 34, 51 and 36, it is apparent that the image produced from the mirror 27 will be inverted and will be superimposed on the erect image produced by the mirror 33 as the two images are seen on the mirror 51 or the mirror 36.

In the event that it is desired to view the superimposed images on the mirror 51 rather than on the mirror 36, this can be done by operating the adjusting knob 39 to turn the mirror 36 to a flat position parallel to the gear 22 so that mirror 51 can be observed directly from a sight opening at 52 in the housing 10, see Figure 3. Angular adjustment of the mirrors 27 and 33 can be effected by operation of the motor 14 in a manner which will be hereinafter more fully described and can be effected manually by operation of a knurled knob 53 fastened as by a set screw 53a on an end of shaft 23 which projects through the cover 12 of the casing 10 of the instrument. As can be seen upon reference to Figure 1, the knob 53 is provided with a pointer 54 which registers with a scale 55 fastened on the cover 12 of the instrument. By turning the knob 53 it is possible to adjust to any extent the angular position of the mirrors 33 and 27, the mirror 33 being driven directly from the shaft 23 and the mirror 27 being driven indirectly therefrom through gears 22 and 18. So that the adjustment of the mirrors 27 and 33 once attained may be maintained, a set screw 56 is provided in the pointer 54 so that the pointer and knob may be locked in any angular position of adjustment by turning down the set screw to cause its end to bear on the cover 12 of the casing 10, see Figure 4. Since adjustment of the mirrors 27 and 33 also results in adjustment of the shutter 42, it is apparent that in some angular positions of the mirrors 27 and 33 the image produced thereby would not be viewable at eyepiece 48. Thus, when the mirrors are being manually adjusted by operation of the knob 53 the knob 39 is turned to move the mirror 36 out of position so that the sight opening at 52 may be used by the operator. Since the mirrors 33 and 27 are connected through a gear train to a shaft 15 of the motor 14, it is understood that an over-running clutch will be provided if a clock motor is provided at 14. If an electric motor is used, it is simply de-energized and the motor is turned along with the rest of the gear train as the operator manually adjusts the knob 53.

Should it be desirable to use the eyepiece at 48 at times when the shutter 42 would cause interference, the latter may be either removed or adjusted in any angular position by removing the front wall 12 and loosening the set screw 45a which normally locks the hub 45 of the shutter for rotation with the shaft 23.

Because of the brilliance of the sun image it is desirable to provide a sun filter in the side of the sight window 49 through which light to the mirror 34 passes. Such a filter is shown diagrammatically at 49a in Figure 4. The angular position of the mirror 34 is rendered adjustable by the attachment of an operating arm 57 to the sleeve 35a on which the mirror 34 is mounted. The arm 57 projects through a slot at 58 in the casing and registers with a scale 59 on the partition 13, see Figures 1 and 2.

The foregoing description has been concerned solely with the structural features of the invention and its use as a sextant will now be explained. It is to be understood that the mirrors 27 and 33 are susceptible of movement to a position where they will produce two horizons 180° apart on the mirror 51, which horizons may be viewed through either the sight opening at 52 or the eyepiece at 48, depending upon the position of the mirror 36. When the two horizons are correlated with a celestial body, the image of the celestial body is introduced into the instrument through the sight window at 49, the image being caused to be reflected by the mirror 34 to the mirror 51 and from thence to the operator's eye.

The instrument as described above may be used under conditions where the operator has a fixed position above the surface of the earth and where the operator has a constantly varying position above the surface of the earth. In the first case, where the operator's height is fixed, the mirror 36 may be moved out of the way and the eyepiece 52 may be used. Sighting through the eyepiece 52, the operator adjusts the mirrors 27 and 33 by use of the knob 53 until virtual images of superimposed horizons are produced on the mirror 51, one inverted and one erect, see Figure 6. The operator then, by movement of the arm 57, adjusts the angular position of the mirror 34 until a virtual image of the celestial body being used for the sight lies between two horizons appearing on the mirror 51, see again Figure 6. At this point the time is noted and the angular position of the mirror 34 is noted. It can be seen that the necessity for dip correction is eliminated since the image of the celestial body is centered between the two horizon images on the mirror 51, and hence is bisected by a plane parallel to a plane tangent to the earth at the point of observation. This can be better understood by reference to Figure 6, wherein the virtual image seen on the mirror 51 by an observer looking through the sight opening at 52 is shown. The dark areas 60 and 61 represent respectively the earth's surface below the horizon as picked up by the mirrors 27 and 33. It is possible so to adjust the mirrors that the dark areas 60 and 61 almost touch at the broken line 62 and this line represents a plane parallel to a plane tangent to the earth's surface at the point of observation. The reading of pointer 56 on scale 55 is a measurement of the dip. It is therefore also possible, subject to human error, to center the image of the celestial body indicated in Figure 6 at 63, with respect to the broken line 62, but in that case should the operator improperly center the celestial body with respect to the line there would be an error. It has been found much easier mentally to project the margins of the dark areas 60 and 61 as indicated in broken lines 64 and 65 and to locate the image of the celestial body therebetween. Incidentally such location of the celestial body automatically eliminates the necessity for semi-diameter correction. Also, since two images are taken, the error of refraction is automatically eliminated.

When the observer is subjected to wave motion and is therefore at a continually varying height above the surface of the earth, it is usually more convenient to adjust the mirror 36 to reflect the image from the mirror 51 to the eyepiece 48 and to operate the motor 14 to propel the mirrors 27 and 33 at a rate convenient to the operator. In this case the operator is given a large number of successive images representing two superimposed horizons and the reference line may appear as a band of varying width. The operator, however, needs only to dispose the image of the celestial body centrally with respect to this band in order to produce the desired results.

It will be understood that when the virtual image reflecting from the mirror 36 is used as the observation point, the horizons and celestial body will be laterally reversed with respect to the position shown in Figure 6. When the mirrors 27 and 33 are driven the shutter 42 is driven with them and interrupts the light path between the eyepiece 48 and the mirror 36 except when the mirrors 27 and 33 are in horizontal scanning position. The effect of the shutter is to eliminate stray light effects caused by the rotation of the mirrors and to permit concentration of the observations on the virtual images of the horizons.

While the foregoing examples of operation have suggested manual adjustment of the mirrors when the operator has a fixed height above the earth's surface and mechanical propulsion of the mirrors when the operator has a varying height above the earth's surface, it is apparent that manual adjustment is possible in the latter case and mechanical in the former. When the operator's height is fixed the successive images are perfectly adequate but are not really necessary since the observation point is fixed. When the height of the operator is varying he can take the sight at any given instant when the picture of Figure 6 is presented, but his convenience will be better served by driving the mirrors under these conditions.

Under circumstances when the brightness of the horizons is important, the dip can be measured alone, in which case mirror 33 can be removed and the two, full brilliance horizons reflected in side by side relation to the mirror 51 from the mirrors 27 and 34, the back horizon being scanned by mirror 27 and the front one by mirror 34, no celestial body being required in effecting dip measurements. The dip, of course, is read from the scales adjacent the pointers 54 and 57.

In view of the arrangement for the removal of the transparent mirror 33 by mounting the same, as shown in Figure 5, it is possible then to use this sextant by referring the celestial body image to the horizon produced by the mirror 27, whether mirror 27 is reflecting the back horizon as shown in Figure 3, or the front horizon as by rotation of mirror 27 through a 90° angle. It is understood that if the back horizon is used, the correction for the dip will be of an opposite sign to the correction used for the front horizon. Similarly, the transparent mirror 33 may be replaced by an opaque mirror and the instrument used by referring the celestial body image to the front horizon image produced by the opaque mirror in the position of mirror 33. These readings are read from scales 54 and 57. This may be of value where the brightness of the image is more important than the elimination of dip compensations and in circumstances where shooting the rear horizon may present substantial advantages in avoiding interference with the structural parts of an aircraft or a ship.

The invention has been described with respect to but a single embodiment thereof and those skilled in the art will understand that the instrument is susceptible of various uses and various modifications dependent upon different operating conditions.

What is claimed is:

1. A navigation instrument comprising light receiving and reflecting means, an eye piece through which images on said receiving and reflecting means may be viewed, a pair of scanning mirrors for scanning horizons 180° apart, a housing having light ports in opposite sides thereof, means mounting said scanning mirrors in said housing in registry with said light ports, said scanning mirrors being mounted in said housing for rotation in opposite directions in synchronism about horizontal axes to reflect simultaneously superimposed, mutually inverted horizon images on said receiving and reflecting means and angularly adjustable means including a reflective surface to reflect an image of a celestial body on said receiving and reflecting means at a position adjacent the horizon images.

2. A navigation instrument comprising light receiving and reflecting means, means for restricting the line of sight to said receiving and reflecting means, a pair of scanning mirrors for scanning horizons 180° apart and for reflecting the images thereof to said receiving and reflecting means, means mounting said mirrors for angular adjustment on parallel axes to reflect horizons at different distances therebelow, one of said scanning mirrors being transparent and lying in the light path between the other of said scanning mirrors and said receiving and reflecting means whereby the images reflected by said scanning mirrors to said receiving and reflecting means are superimposed, the positions of said scanning mirrors relative to said receiving and reflecting means being such as to produce one erect image and one inverted image on the receiving and reflecting means and means for reflecting a virtual image of a celestial body onto said light receiving and reflecting means in a position adjacent said horizon images.

3. A navigation instrument as claimed in claim 2 further comprising means for detachably mounting the transparent mirror for selective removal from the optical system.

4. A navigation instrument comprising light receiving and reflecting means, means for viewing said receiving and reflecting means, two scanning mirrors, means mounting said scanning mirrors for rotation about horizontal axes, means gearing said mirrors together for rotation in opposite directions at a 1:1 ratio in relative angular positions such that when one mirror receives light from one horizon the other mirror receives light from the other horizon, one of said mirrors being transparent and lying in the light path between the other of said mirrors and said receiving and reflecting means, means for rotating said mirrors to a position to reflect superimposed images of horizons 180° apart on said light receiving and reflecting means, said mirrors being so located with respect to said receiving and reflecting means that one of the reflected horizon images is erect and the other is inverted, a mirror for reflecting an image of a celestial body on said receiving and reflecting means at a point adjacent said horizon images and means for angularly adjusting the position of the last named mirror.

5. A navigation instrument comprising light receiving and reflecting means, means for viewing said receiving and reflecting means, two scanning mirrors, means mounting said scanning mirrors for rotation about horizontal axes means gearing said mirrors together for rotation in opposite directions at a 1:1 ratio in relative angular positions such that when one mirror receives light from one horizon the other mirror receives light from the other horizon, one of said mirrors being transparent and lying in the light path between the other of said mirrors and said receiving and reflecting means, driving means for rotating said mirrors to cause them to reflect in rapid succession on said receiving and reflecting means a large number of superimposed images of horizons 180° apart, shutter means driven by said driving means for limiting visual access to said receiving and reflecting means to the horizon scanning positions of said mirrors, said mirrors being so located with respect to said receiving and reflecting means that one of the horizon images is erect and the other is inverted, a mirror for reflecting an image of a celestial body on said receiving and reflecting means at a point adjacent said horizon images and means for angularly adjusting the position of the last named mirror.

6. A navigation instrument comprising light receiving and reflecting means, means for viewing said receiving and reflecting means, two scanning mirrors, means mounting said scanning mirrors for rotation about horizontal axes, means gearing said mirrors together for rotation in opposite directions at a 1:1 ratio in relative angular positions such that when one mirror receives light from one horizon the other mirror receives light from the other horizon, one of said mirrors being transparent and lying in the light path between the other of said mirrors and said receiving and reflecting means, driving means for rotating said mirrors to cause them to reflect in rapid succession on said receiving and reflecting means, a large number of superimposed images of horizons 180° apart, shutter means intermediate said receiving and reflecting means and the means for viewing it, means operatively connecting said driving means and said shutter means for operation in timed relation with said mirrors so that the shutter means limits visual access to said receiving and reflecting means to the horizon reflecting positions of said mirrors, said mirrors being so located with respect to said receiving and reflecting means that one of the reflected horizon images is erect and the other is inverted, a mirror for reflecting an image of a celestial body on said receiving and reflecting means at a point adjacent said horizon images and means for angularly adjusting the position of the last named mirror.

7. A navigation instrument comprising a first means for receiving and reflecting virtual images, means for viewing said first means, two scanning mirrors, means mounting said scanning mirrors for rotation about horizontal axes, means gearing said mirrors together for rotation in opposite directions at a 1:1 ratio in relative angular positions such that when one mirror receives light from one horizon the other mirror receives light from the other horizon, one of said mirrors being transparent and lying in the light path between the other of said mirrors and said first means, driving means for rotating said mirrors to cause them to reflect on said first means in rapid succession a large number of superimposed images of horizons 180° apart, a second means for receiving and reflecting virtual images, said second means being located intermediate said first means and the means for viewing it, means mounting said second means for movement from a position bending and intercepting the light path between the first means and the means for viewing it, and means for viewing the visual image on said second means in its light intercepting position, shutter means intermediate said second means and the viewing means therefor, and means for driving said shutter means from said driving means to limit visual access to said second receiving and reflecting means to the horizon scanning positions of said mirrors, said mirrors being so located with respect to said receiving and reflecting means that one of the reflected horizon images is erect and the other is inverted, a mirror for reflecting an image of a celestial body on said first means at a point adjacent said horizon images and means for angularly adjusting the position of the last named mirror.

WILLIAM H. HOLMAN, III.

REFERENCES CITED

The following references are of record in the file of this patent:

UNITED STATES PATENTS

| Number | Name | Date |
|---|---|---|
| 714,276 | Blish | Nov. 25, 1902 |
| 738,631 | Saegmuller et al. | Sept. 8, 1903 |
| 854,310 | Robertson | May 21, 1907 |
| 1,337,912 | Hughes et al. | Apr. 20, 1920 |
| 1,339,006 | Sperry | May 4, 1920 |
| 1,573,269 | Paulus et al. | Feb. 16, 1926 |
| 1,683,073 | Henderson | Sept. 4, 1928 |
| 2,181,832 | Moerbitz et al. | Nov. 28, 1939 |

FOREIGN PATENTS

| Number | Country | Date |
|---|---|---|
| 544,217 | Great Britain | Apr. 2, 1942 |